United States Patent
Jen et al.

(10) Patent No.: US 8,488,898 B2
(45) Date of Patent: Jul. 16, 2013

(54) FILTER AND METHOD FOR REMOVING IMAGE ERRORS AND ASSOCIATED DISPLAY CIRCUIT

(75) Inventors: Li-Huan Jen, Hsinchu Hsien (TW); Kun-Nan Cheng, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 637 days.

(21) Appl. No.: 12/759,560

(22) Filed: Apr. 13, 2010

(65) Prior Publication Data
US 2010/0266219 A1    Oct. 21, 2010

(30) Foreign Application Priority Data
Apr. 17, 2009    (TW) ................................ 98112747 A

(51) Int. Cl.
*G06K 9/40* (2006.01)
*H04N 7/01* (2006.01)

(52) U.S. Cl.
USPC .......................................... 382/260; 348/441

(58) Field of Classification Search
USPC .................. 382/260, 298, 300; 348/441, 448, 348/458, 715, 716; 345/660
See application file for complete search history.

(56) References Cited

U.S. PATENT DOCUMENTS

| | | | |
|---|---|---|---|
| 5,786,866 A * | 7/1998 | Sani et al. | 348/520 |
| 6,556,193 B1 * | 4/2003 | Auld et al. | 345/418 |
| 6,563,544 B1 * | 5/2003 | Vasquez | 348/447 |
| 7,197,194 B1 * | 3/2007 | Ratcliffe | 382/298 |
| 2004/0070778 A1 * | 4/2004 | Matama | 358/1.9 |
| 2006/0077213 A1 * | 4/2006 | Li | 345/660 |

* cited by examiner

*Primary Examiner* — Yon Couso
(74) *Attorney, Agent, or Firm* — Han IP Law PLLC

(57) ABSTRACT

A filter for eliminating image errors, as well as associated method and TV signal display circuit, is provided to determine the filter coefficients according to the regularity of image errors in an image signal or a TV signal, thereby removing the image errors. The filter includes a plurality of multipliers and an adder. The multipliers receive a plurality of pixel values from a plurality of scan lines, multiply the pixel values by a plurality of corresponding weight coefficients and output the result; the adder sums up the outputs of the multipliers to generate an output pixel value. The errors have a regularity and the corresponding weight coefficients are associated with the regularity such that the errors of the pixel values may be canceled when the adder generates the output pixel value.

20 Claims, 7 Drawing Sheets

|    | f0  | f1  | f2  | f3  |
|----|-----|-----|-----|-----|
| L0 | +E0 | +E1 | +E2 | +E3 |
| L1 | −E0 | −E1 | −E2 | −E3 |
| L2 | +E0 | +E1 | +E2 | +E3 |
| L3 | −E0 | −E1 | −E2 | −E3 |
| L4 | ... | ... | ... | ... |

FIG. 1A (Prior Art)

|    | F0  | F1  |
|----|-----|-----|
| L0 | +E0 | +E2 |
| L1 | +E1 | +E3 |
| L2 | −E0 | −E2 |
| L3 | −E1 | −E3 |
| L4 | +E0 | +E2 |
| L5 | +E1 | +E3 |
| L6 | −E0 | −E2 |
| ... | ... | ... |

FIG. 1B (Prior Art)

FILTER AND METHOD FOR REMOVING IMAGE ERRORS AND ASSOCIATED DISPLAY CIRCUIT

CROSS REFERENCE TO RELATED PATENT APPLICATIONS

This patent application claims priority from Taiwan Patent Application No. 098112747, filed in the Taiwan Patent Office on Apr. 17, 2009, and incorporates the Taiwan patent application in its entirety by reference.

TECHNICAL FIELD

The present disclosure relates to image processing, and more particularly to a filter for removing image errors and associated method and display circuit.

BACKGROUND OF THE PRESENT DISCLOSURE

In the Phase Alternating Line (PAL) television encoding system, chroma phase errors with regularity are generated when the chroma signal of the television signal is demodulated. That is, in each field, the chroma value of each pixel in each scan line comprises an error, and the errors of adjacent scan lines are alternately positive and negative, as shown in FIG. 1A. In FIG. 1A, the fields are denoted in f, and f0 to f3 represent four consecutive fields, wherein f0 and f2 are even fields, and f1 and f3 are odd fields. L0, L1, L2 . . . are in sequence scan lines of the frame. As shown in FIG. 1, the even fields and the odd fields comprise even and odd numbers of scan lines respectively. In the same field, the errors in adjacent scan lines are equal in magnitude but opposite in sign. For example, in the even field f0, the errors of scan lines L0, L2, L4, L6 . . . are +E0, −E0, +E0, −E0 . . . respectively. Further, the errors of scan lines in different fields can be different. For example, the errors of scan lines in the fields f0 and f1 are ±E0 and ±E1 respectively.

The fields in FIG. 1A are de-interlaced to produce the frames, denoted in F, in FIG. 1B. The frame F0 is formed by de-interlacing the fields f0 and f1, and the frame F1 is produced by de-interlacing the fields f2 and f3. After the fields in FIG. 1A are de-interlaced, the errors of neighboring even scan lines (such as L0 and L2, or L2 and L4) and the errors of neighboring odd scan lines (such as L1 and L3 or L3 and L5) in each frame are equal in magnitude and opposite in sign.

FIG. 2 is a schematic diagram showing a conventional structure for processing a television signal. As shown in FIG. 2, a video decoder 21 decodes a received television signal, and transmits the decoded television signal to the de-interlacing circuit 22. Finally, the signal is scaled by a scaler 23 for output. In the prior structure of FIG. 2, the errors of the PAL television signal described above are eliminated by the video decoder 21. In order to eliminate the errors, one or two additional scan line buffers are required in the video decoder 21 to temporarily store the scan lines of fields. As a result, both hardware cost and time for signal processing are increased.

SUMMARY OF THE PRESENT DISCLOSURE

It is an objective of the present disclosure to provide a filter and a method for eliminating image errors, so as to save hardware cost and time for signal processing.

It is another objective of the present disclosure to provide a filter and a method for eliminating image errors by programming coefficients of the filter according to a regularity of the image signal errors.

It is another objective of the present disclosure to provide a television signal display circuit to eliminate the errors of chroma signals in television signal when vertically scaling a television signal, so as to save both hardware cost and time for signal processing.

The present disclosure provides a filter for canceling image errors. The filter comprises a plurality of multipliers, for receiving a plurality of pixel values from a plurality of scan lines, and multiplying the pixel values by a plurality of corresponding weight coefficients; and an adder, for summing the outputs of the multipliers to generate an output pixel value. The pixel values comprise errors having a regularity associated with the corresponding weight coefficients, so that the errors are mutually canceled when the adder generates the output pixel value.

The present disclosure further provides a method for canceling image errors. The method comprises steps of: receiving from a plurality of scan lines a plurality of pixel values comprising a plurality of errors, magnitudes of which having a regularity; multiplying the pixel values by a plurality of corresponding weight coefficients respectively to generate a plurality of intermediate values, wherein the corresponding weight coefficients are associated with the regularity of the errors; and summing the intermediate values to generate an output pixel value to cancel out the errors.

The present disclosure further provides a television signal display circuit. The display circuit comprises: a video decoder, for receiving and decoding a television signal to generate a chroma signal comprising a signal error; a de-interlacing circuit, coupled to the video decoder, for de-interlacing the chroma signal; and a scaler, coupled to the de-interlacing circuit, for scaling the de-interlaced chroma signal and filtering out the signal error.

BRIEF DESCRIPTION OF THE DRAWINGS

The present disclosure will become more readily apparent to those ordinarily skilled in the art after reviewing the following detailed description and accompanying drawings, in which:

FIG. 1A depicts errors in fields in a conventional Phase Alternating Line (PAL) system.

FIG. 1B depicts errors in frames after the fields in FIG. 1A are de-interlaced.

DETAILED DESCRIPTION OF THE PREFERRED EMBODIMENT

Figure 2:
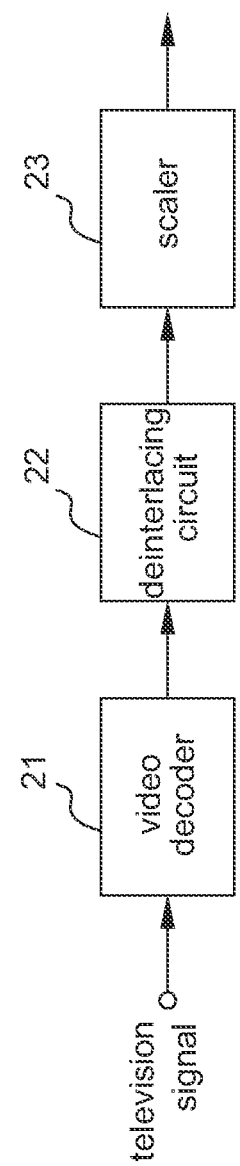
FIG. 2 shows a conventional structure for processing a television signal.

According to one embodiment of the present disclosure to be described, errors in the signal are eliminated when scaling images vertically. The signal may be chroma signal in Phase Alternating Line (PAL) television signals, or image signals having error pattern similar to the error regularity shown in FIG. 1B. More specifically, in the conventional structure for image processing in FIG. 2, since the error is eliminated in a video decoder 21, not only a scan line buffer is additionally provided to temporarily store scan lines, but also extra processing time is required to eliminate the errors. In contrast, according to the present disclosure, the errors are eliminated at the same time that the images are scaled vertically in the scaler 23. Further, an additional scan line buffer is not required for that the scaler 23 is originally built in with a scan line buffer. Therefore, both the hardware cost and the time for signal processing is saved.

Figure 3:
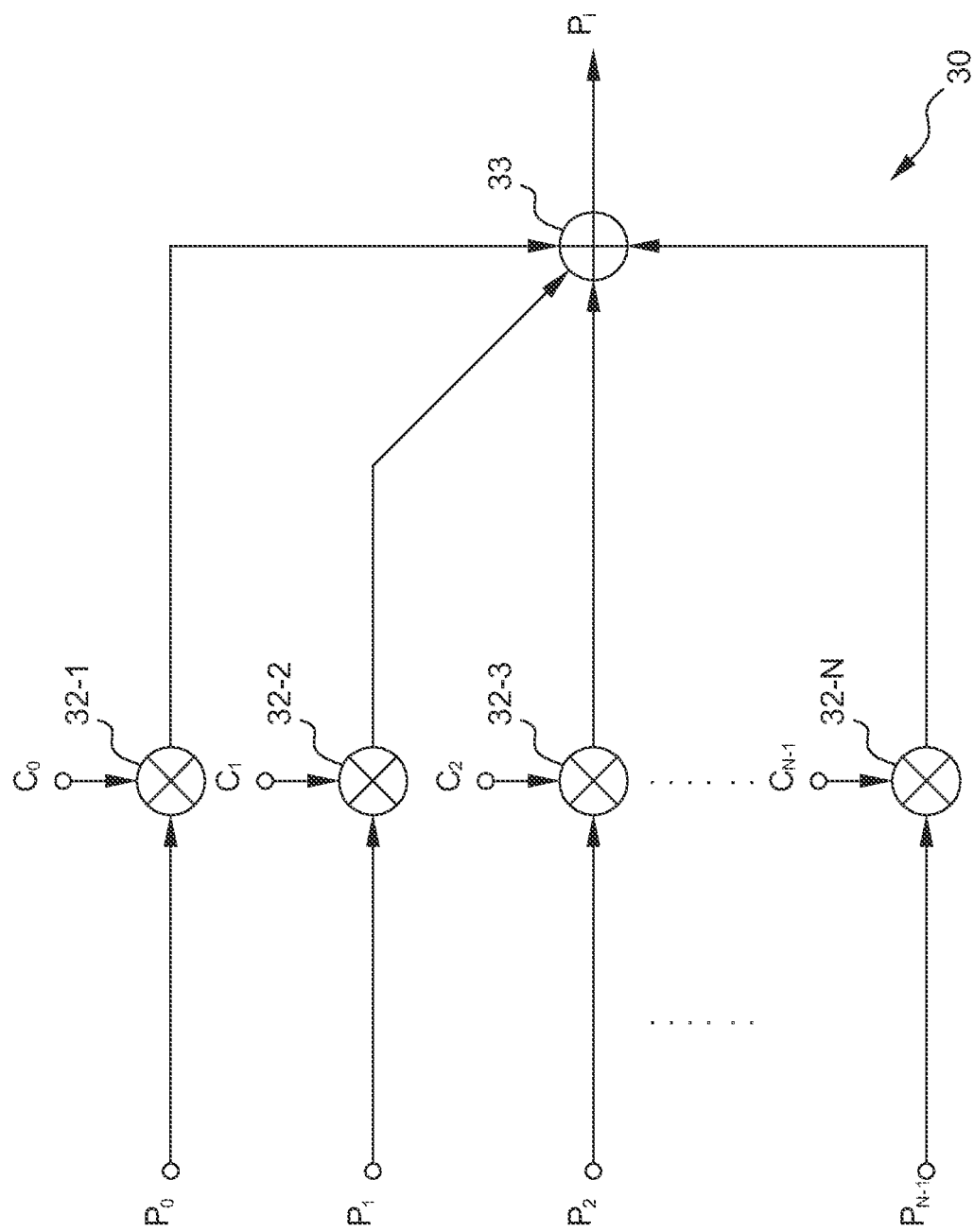
FIG. 3 is a circuit diagram of a filter for eliminating image errors according to one preferred embodiment of the present disclosure.

FIG. 3 is a circuit diagram of a filter 30 for eliminating image error according to one preferred embodiment of the present disclosure. The filter 30 is an N-taps filter and comprises N multipliers 32-1 to 32-N, and an adder 33. The N taps comprise corresponding weight coefficients, referred to as tap coefficients $C_0, C_1 \ldots$ and $C_{N-1}$. The N multipliers 32-1 to 32-N receive pixel values respectively from the N scan lines, and multiply the pixel values by the corresponding weight coefficients to generate an output. The adder 33 sums N outputs of the N multipliers to generate an output pixel value. Suppose the errors of the received pixel values occur with regularity. The magnitudes of the corresponding weight coefficients are arranged properly according to the regularity, so as to eliminate the errors when the adder 33 generates the output pixel value as well as reducing the complexity of the circuit design.

For example, when the filter 30 is realized by a vertical scaling filter 30 in a vertical scaler, the vertical scaling filter 30 receives de-interlaced frames of a PAL television signal. Alternatively, other kinds of de-interlaced frames with errors having similar regularity while being vertically scaled. The adder 33 removes the errors in frames. For example, the N multipliers 32-1 to 32-N receive N pixel values $P_0$ to $P_{N-1}$ of consecutive N scan lines respectively. Next, the N multipliers multiply the N pixel values, $P_0, P_1 \ldots P_{N-1}$, by the corresponding weight coefficient. $C_0, C_1 \ldots C_{N-1}$, respectively, and then output the results. The adder 33 sums the outputs of the N multipliers to generate an interpolated pixel value $P_i$. Hence, the equation 1 is obtained as follows:

$$P_i = P_0 \times C_0 + P_1 \times C_1 + \ldots + P_{N-1} \times C_{N-1} \quad \text{(equation 1)}$$

Supposing the N pixel values are the chroma values in the PAL system, the errors thereof have the regularity as shown in FIG. 1B. The pixel values $P_0, P_4 \ldots$ comprise a first error respectively, the pixel values $P_2, P_6 \ldots$ comprise a second error respectively, the pixel values $P_1, P_5 \ldots$ comprise a third error respectively, and the pixel values $P_3, P_7 \ldots$ comprise a fourth error respectively. The first error and the second error are equal in magnitude and opposite in sign, and the third error and the fourth error are equal in magnitude and opposite in sign. In the filter 30, the weight coefficient of N taps $C_0, C_1, \ldots, C_{N-1}$ are arranged as such that the sum of $C_0, C_4 \ldots$ is equal to the sum of $C_2, C_6, \ldots$, and the sum of $C_1, C_5 \ldots$ is equal to the sum of $C_3, C_7, \ldots$. In this embodiment, the error terms in the equation 1 may be expressed as follows:

$$(C_0+C_4\ldots)\times\text{first error}+(C_2+C_6\ldots)\times\text{second error}+ \\ (C_1+C_5\ldots)\times\text{third error}+(C_3+C_7\ldots)\times\text{fourth error}=0$$

Therefore, the errors are cancelled out by the arranged negative and positive values. In other words, by generating the interpolated pixel values according to the equation 1, the errors are eliminated simultaneously while the filter 30 performs vertical scaling.

For example, when N is four, the relation of weight coefficients of taps is exemplified as $C_0$ equals $C_2$ and $C_1$ equals $C_3$.

Figure 4:
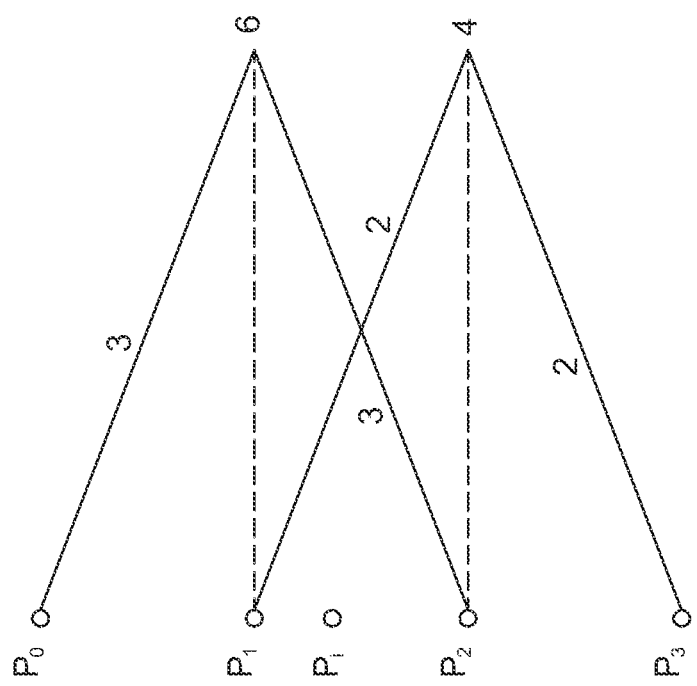
FIG. 4 depicts a diagram of weight coefficients of taps in FIG. 3 according to one preferred embodiment of the present disclosure.

FIG. 4 depicts a diagram of arranging the corresponding weight coefficients of taps according to one embodiment of the present disclosure. The interpolated pixel value $P_i$ is generated according to four pixel values $P_0, P_1, P_2$, and $P_3$, and $P_i$ is located between $P_1$ and $P_2$. Suppose $P_i$ is near $P_1$, and the weight proportions associated with $P_1$ and $P_2$ are 6:4. The weight proportion of $P_1$ is larger than that of $P_2$ because $P_i$ is nearer to $P_1$. Preferably, the weight coefficients of $P_0$ and $P_2$ are equal, so that the weight proportion 6 provided by $P_1$ is divided equally between $P_0$ and $P_2$. The weight coefficients of $P_0$ and $P_2$ are both arranged as 3, i.e., $C_0=C_2=3$. Preferably, the weight coefficients of $P_1$ and $P_3$ are equal, so that the weight proportion 4 provided by $P_2$ is divided equally for $P_1$ and $P_3$. The weight coefficients of $P_1$ and $P_3$ are both arranged as 2, i.e., $C_1=C_3=2$. The weight proportions provided by $P_1$ and $P_2$ are varied along with different positions of the interpolated pixel value Pi between $P_1$ and $P_2$.

Figure 5:
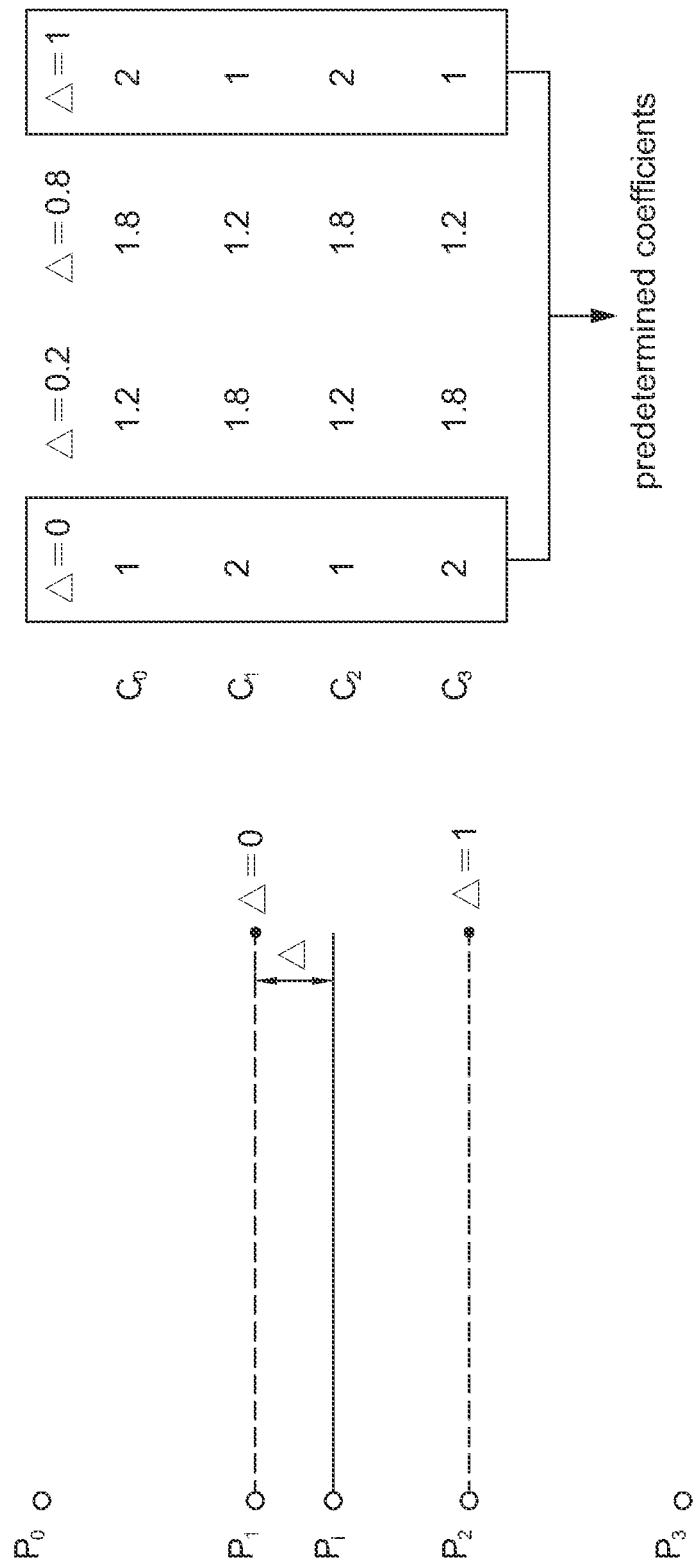
FIG. 5 depicts a diagram of weight coefficients of taps in FIG. 3 according to one preferred embodiment of the present disclosure.

FIG. 5 depicts a diagram of arranging the corresponding weight coefficients of taps according to another embodiment of the present disclosure. The interpolated pixel value $P_i$ is generated according to four pixel values $P_0, P_1, P_2$, and $P_3$, and $P_i$ is located between $P_1$ and $P_2$. In FIG. 5, a scaling factor $\Delta$ representing the distance between $P_i$ and $P_1$ is introduced. When the scaling factor $\Delta$ equals 0, $P_i$ is located at the position of $P_1$. When the scaling factor $\Delta$ equals 1, $P_i$ is located at the position of $P_2$. In this embodiment, the weight coefficients for the scaling factor $\Delta=0$ and $\Delta=1$ are arranged in advance. When the scaling factor $\Delta$ lies between 0 and 1, the required weight coefficients may be obtained through alpha blending calculation according to the value of $\Delta$ and the two predetermined weight coefficients. For example, the weight coefficients $(C_0, C_1, C_2, C_3)$ of $\Delta=0$ and $\Delta=1$ are predetermined as $(1,2,1,2)$ and $(2,1,2,1)$ respectively, as shown in FIG. 5. When $\Delta=0.2$, $C_0=2\times\Delta+1\times(1-\Delta)=1.2$ and $C_1=1\times\Delta+2\times(1-\Delta)=1.8$. $C_2$ and $C_3$ may also be calculated likewise. The procedure for $\Delta=0.8$ is similar to the above.

Figure 6:
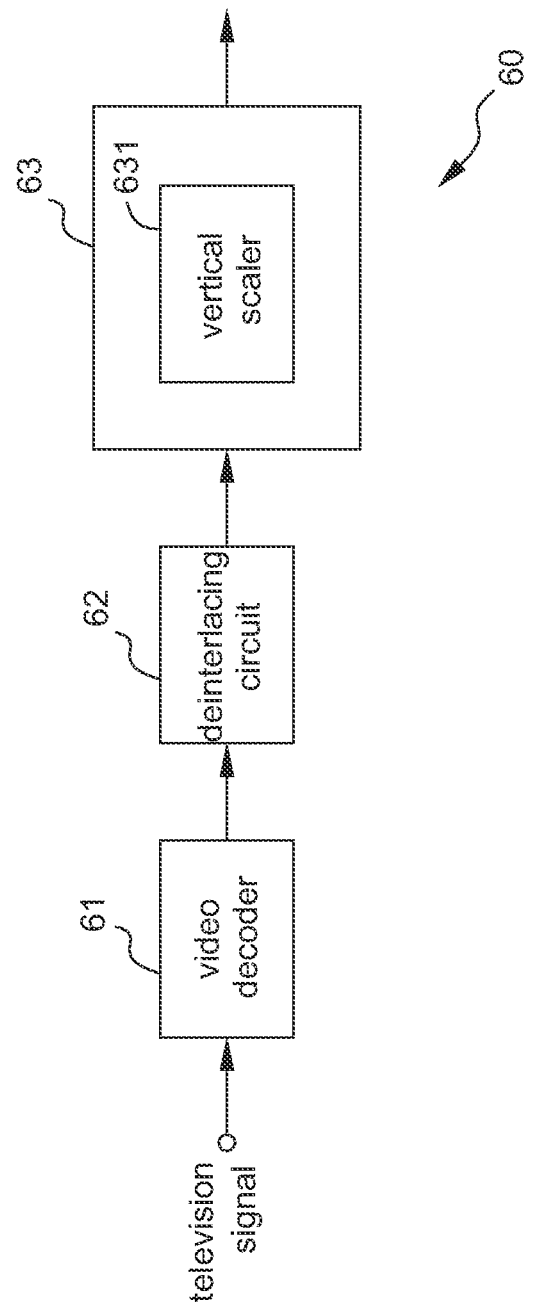
FIG. 6 is a block diagram of a display circuit according to one preferred embodiment of the present disclosure.

FIG. 6 is a block diagram of a television signal display circuit 60 according to one preferred embodiment of the present disclosure. The display circuit 60 comprises a video decoder 61, a de-interlacing circuit 62 and a scaler 63. The video decoder 61 receives a television signal and decodes the television signal to generate a chroma signal with a signal error. For example, the television signal is a PAL television signal, and the signal error is a chroma phase error. The de-interlacing circuit 62 coupled to the video decoder 61 de-interlaces the chroma signal decoded by the video decoder 61. The scaler 63 coupled to the de-interlacing circuit 62 scales the de-interlaced chroma signal and filters the signal error simultaneously. For example, the scaler 63 comprises a vertical scaler 631, which is a 4-tap filter with a circuit structure similar to the filter 30 in FIG. 3. The four taps respectively receive the pixel values of four consecutive scan lines in the de-interlaced chroma signal to generate the interpolated pixel value. The chroma phase errors have the regularity as shown in FIG. 1B when the television signal is the PAL television signal. Preferably, the corresponding weight coefficients $C_0, C_1, C_2$ and $C_3$ are set as such that $C_0$ equals $C_2$ and $C_1$ equals $C_3$. Therefore, the vertical scaler 631 performs vertical scaling and eliminates chroma phase errors simultaneously without extra line buffer.

Figure 7:
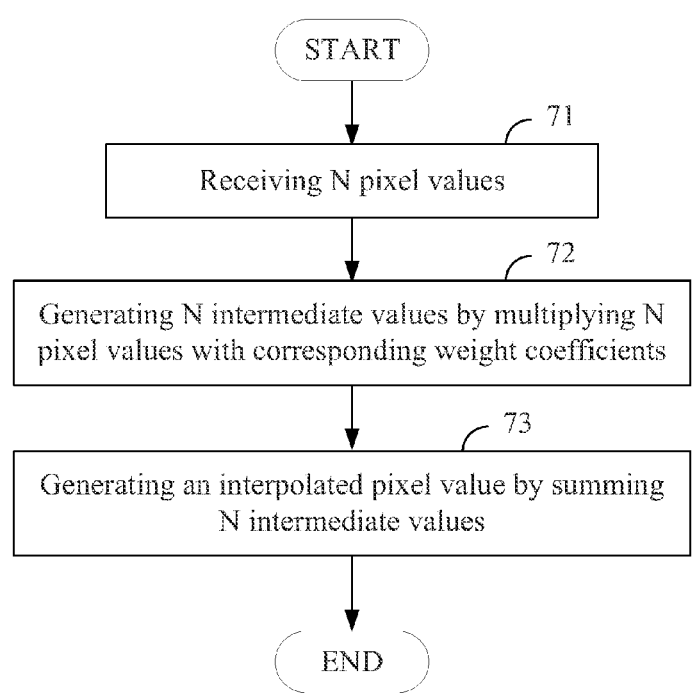
FIG. 7 is a flow chart of a vertical scaling method according to one preferred embodiment of the present disclosure.

FIG. 7 is a flow chart of eliminating image errors according to one preferred embodiment of the present disclosure. In Step 71, N pixel values $P_0, P_1 \ldots$ and $P_{N-1}$ from N scan lines, such as the N consecutive scan lines in a frame, are received.

The N pixel values can be chroma values in the PAL system, or other pixel values comprising the errors with similar regularity. In Step 72, the N pixel values are multiplied by corresponding weight coefficients $C_0, C_1 \ldots$ and $C_{N-1}$ respectively to generate N intermediate values. The sum of $C_0, C_4 \ldots$ equals the sum of $C_2, C_6 \ldots$ and the sum of $C_1, C_5 \ldots$ equals the sum of $C_3, C_7 \ldots$. In Step 73, the N intermediate values are summed up to generate an interpolated pixel value.

To sum up, the present disclosure provides a filter for eliminating image errors. The filter comprises N multipliers and an adder. The N multipliers receive N pixel values $P_0, P_1 \ldots$ and $P_{N-1}$ associated with N scan lines. The N multipliers multiply each pixel value by a corresponding weight coefficient to generate an output. The adder sums the output of the N multipliers to generate an output pixel value. The magnitudes of the errors in pixel values have a regularity associated with the corresponding coefficients. Therefore, the errors can be canceled when the adder generates the output pixel value. When the N pixel values are the chroma values complying with the PAL specification, in order to eliminate the chroma phase errors of the N pixel values, the corresponding weight coefficients $C_0, C_1 \ldots$ and $C_{N-1}$ are programmed as such that the sum of $C_0, C_4 \ldots$ is equal to the sum of $C_2, C_6 \ldots$ and the sum of $C_1, C_5 \ldots$ is equal to the sum of $C_3, C_7 \ldots$. It should be noted that persons having ordinary skill in the art are able to make various modifications according to the above embodiments. Though the PAL television signal taken as an example in the embodiments, persons skilled in the art may appreciate that the circuit design may be applied to the signal error processing with repeated regularity during image processing. The period of the regularity should be not limited in a multiple of four.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A filter for canceling image errors, comprising:
   a plurality of multipliers coupled to receive a plurality of pixel values of a Phase Alternating Line (PAL) television signal from a plurality of scan lines, the plurality of multipliers configured to multiply the pixel values by a plurality of corresponding weight coefficients to generate a plurality of outputs respectively, the pixel values comprising a plurality of errors having a regularity associated with the corresponding weight coefficients; and
   an adder, coupled to receive the outputs from the plurality of multipliers, that sums the outputs of the multipliers to generate an output pixel value.

2. The filter as claimed in claim 1, wherein the filter is a vertical scaling filter residing in a vertical scaler, and the output pixel value is an interpolated pixel value.

3. The filter as claimed in claim 1, wherein the regularity indicates the errors are alternately positive and negative.

4. The filter as claimed in claim 1, wherein the pixel values are P0, P1, . . . , and PN-1, the corresponding weight coefficients are C0, C1, . . . , and CN-1, and N is larger than four or equal to four; and wherein among the pixel values, each of P0, P4 . . . comprise a first error, each of P2, P6 . . . comprise a second error, each of P1, P5 . . . comprise a third error, each of P3, P7 . . . comprise a fourth error, with the first error being associated with the second error and the third error being associated with the fourth error.

5. The filter as claimed in claim 4, wherein the first error and the second error are equal in magnitude and opposite in sign.

6. The filter as claimed in claim 5, wherein a sum of C0, C4 . . . is equal to a sum of C2, C6 . . . .

7. The filter as claimed in claim 4, wherein the third error and the fourth error are equal in magnitude and opposite in sign.

8. The filter as claimed in claim 7, wherein a sum of C1, C5 . . . is equal to a sum of C3, C7 . . . .

9. The filter as claimed in claim 1, wherein each pixel value represents a chroma value.

10. A method for canceling image errors by a filter comprising a plurality of multipliers and an adder, the method comprising:
    receiving, by the plurality of multipliers, a plurality of pixel values of a Phase Alternating Line (PAL) television signal from a plurality of scan lines, the plurality of pixel values having a plurality of errors with a regularity;
    multiplying, by the plurality of multipliers, the pixel values by a plurality of weight coefficients associated with the regularity respectively to generate a plurality of intermediate values; and
    summing, by the adder coupled to receive the intermediate values from the plurality of multipliers, the intermediate values to generate an output pixel value.

11. The method as claimed in claim 10, wherein the regularity indicates the errors are alternately positive and negative.

12. The method as claimed in claim 10, wherein the pixel values are P0, P1, . . . , and PN-1, the corresponding weight coefficients are C0, C1, . . . , and CN-1, and N is larger than four or equal to four; and wherein among the pixel values, each of P0, P4 . . . comprise a first error respectively, each of P2, P6 . . . comprise a second error respectively, each of P1, P5 . . . comprise a third error respectively, each of P3, P7 . . . comprise a fourth error respectively, with the first error being associated with the second error and the third error being associated with the fourth error.

13. The method as claimed in claim 12, wherein a sum of C0, C4 . . . is equal to a sum of C2, C6 . . . .

14. The method as claimed in claim 12, wherein the first error and the second error are equal in magnitude and opposite in sign, and the third error and the fourth error are equal in magnitude and opposite in sign.

15. The method as claimed in claim 12, wherein a sum of C1, C5 . . . is equal to a sum of C3, C7 . . . .

16. The method as claimed in claim 10, wherein each pixel value is a chroma value.

17. A television signal display circuit, comprising:
    a video decoder that receives and decodes a television signal to generate a chroma signal having a signal error;
    a de-interlacing circuit, coupled to the video decoder, that de-interlaces the chroma signal; and
    a scaler, coupled to the de-interlacing circuit, that scales the de-interlaced chroma signal and filters out the signal error, the scaler comprising a filter that comprises:
        a plurality of multipliers coupled to receive a plurality of pixel values of the television signal from a plurality of scan lines, the plurality of multipliers configured to multiply the pixel values by a plurality of corresponding weight coefficients to generate a plurality of outputs respectively, the pixel values comprising a plurality of errors having a regularity associated with the corresponding weight coefficients; and an adder, coupled to receive the outputs from the plurality of multipliers, that sums the outputs of the multipliers to generate an output pixel value.

18. The display circuit as claimed in claim 17, wherein the television signal is a phase alternate line (PAL) television signal, and the signal error is a chroma phase error.

19. The display circuit as claimed in claim 17, wherein the scaler comprises a vertical scaler that filters out the chroma phase error.

20. The display circuit as claimed in claim 19, wherein the vertical scaler comprises four taps that receive the pixel values of four consecutive scan lines in the de-interlaced chroma signal respectively to generate an interpolated pixel value, and the four taps comprise corresponding weight coefficients C0, C1, C2, and C3, with C0 equal to C2, and C1 equal to C3.

* * * * *